No. 746,860. PATENTED DEC. 15, 1903.
H. R. MARTIN.
TROLLEY CATCHER.
APPLICATION FILED AUG. 7, 1903.
NO MODEL. 2 SHEETS—SHEET 1.
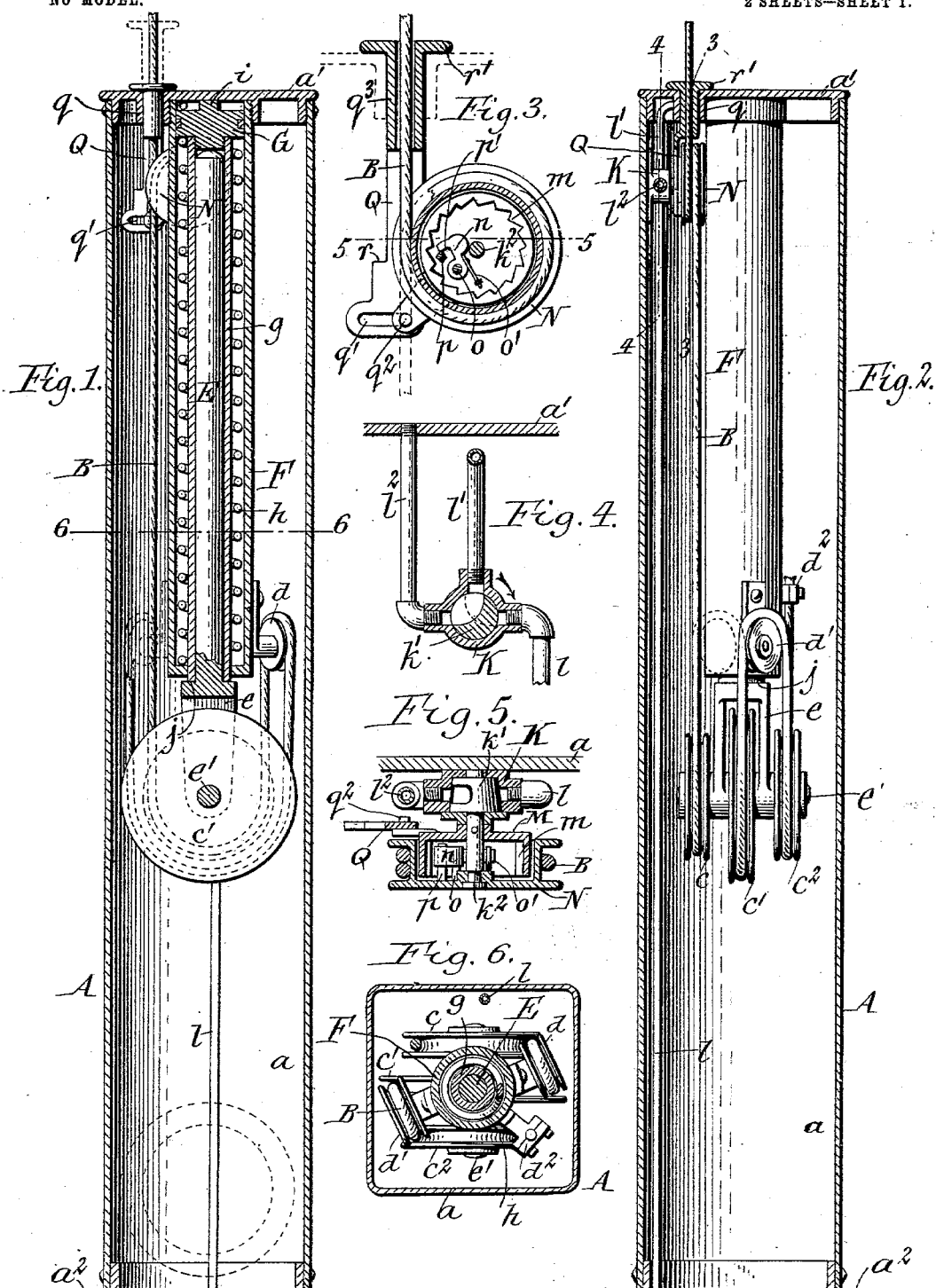

No. 746,860. PATENTED DEC. 15, 1903.
H. R. MARTIN.
TROLLEY CATCHER.
APPLICATION FILED AUG. 7, 1903.
NO MODEL. 2 SHEETS—SHEET 2.
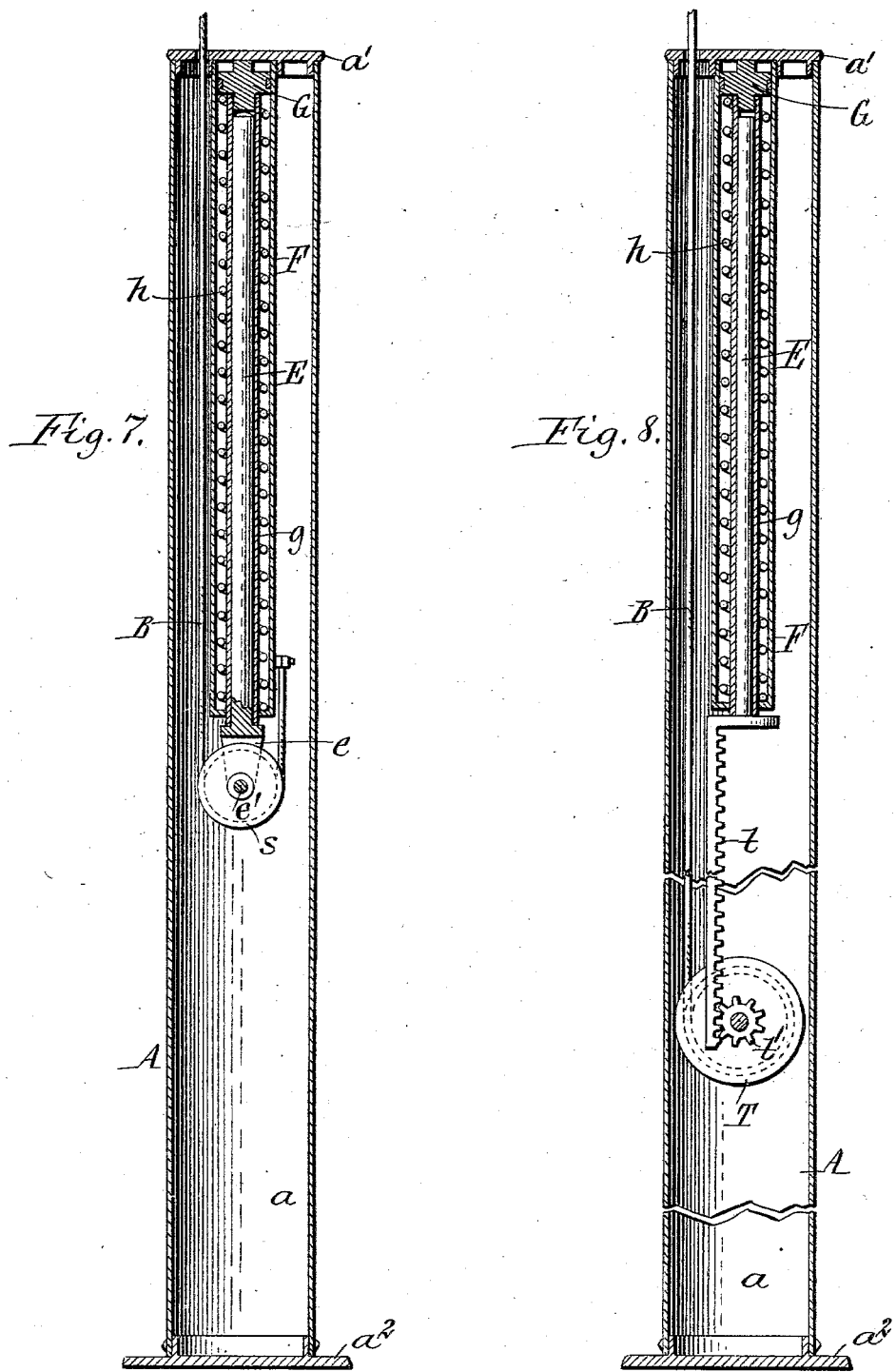

No. 746,860. Patented December 15, 1903.

UNITED STATES PATENT OFFICE.

HORACE R. MARTIN, OF EAST BLOOMFIELD, NEW YORK.

TROLLEY-CATCHER.

SPECIFICATION forming part of Letters Patent No. 746,860, dated December 15, 1903.

Application filed August 7, 1903. Serial No. 168,631. (No model.)

*To all whom it may concern:*

Be it known that I, HORACE R. MARTIN, a citizen of the United States, residing at East Bloomfield, in the county of Ontario and State of New York, have invented new and useful Improvements in Trolley-Catchers, of which the following is a specification.

This invention relates more particularly to that class of trolley-catchers in which the trolley is pulled downwardly by a rope into a position in which it does not strike the overhead supports.

The object of this invention is to produce a trolley-catcher of this character which is simple and durable in construction, reliable in operation, and which can be easily reset after having depressed the trolley.

In the accompanying drawings, consisting of two sheets, Figure 1 is a vertical section of the trolley-catcher, showing one embodiment of my invention. Fig. 2 is a similar section taken at right angles to Fig. 1. Figs. 3 and 4 are fragmentary vertical sections, on an enlarged scale, in lines 3 3 and 4 4, Fig. 2. Fig. 5 is a horizontal section in line 5 5, Fig. 3. Fig. 6 is a horizontal section in line 6 6, Fig. 1. Figs. 7 and 8 are sectional elevations showing modified constructions of my invention.

Similar letters of reference indicate corre30 sponding parts throughout the several views.

Referring to Figs. 1 to 6, A represents the inclosing casing or housing of the trolley-catcher, which preferably consists of a vertically-elongated body $a$, a top $a'$, and a bot35 tom $a^2$.

B represents the rope whereby the trolley is pulled downwardly. This rope is operated upon within the casing by a device which constantly takes up the slack in the rope dur40 ing the ordinary rising-and-falling movement of the trolley and also by a device which pulls the rope downwardly, together with the trolley, if the latter moves upward an abnormal distance in jumping the wire. In the pre45 ferred construction of the rope-take-up and trolley-depressing devices the rope passes around a plurality of multiplying-pulleys, which rise and fall bodily in taking up and paying out the slack in the rope. As shown in Figs. 1, 2, and 6, three multiplying wheels or pulleys $c$ $c'$ $c^2$ are employed, which are arranged side by side and coöperate with two separate guide-rollers $d$ $d'$, arranged above the same. The trolley-rope passes through the top of the casing downwardly around one of the outer multiplying-wheels $c$, thence upwardly and over one of the guide-pulleys $d$, thence downwardly around the under side of the central multiplying-pulley $c'$, thence upwardly and over the other guide-pulley $d'$, thence downwardly underneath the other outer pulley $c^2$, and thence upwardly to a fixed support $d^2$. As the pulleys rise and fall the length of rope which is taken in or paid out is correspondingly multiplied in a well-known manner.

E represents a vertically-movable plunger or weight, preferably of cylindrical form, which guides the multiplying-pulleys and also adds to the weight of the same for maintaining a tension upon the trolley-rope. This plunger is provided at its lower end with a hanger $e$, which carries a horizontal shaft or spindle $e'$, upon which multiplying-pulleys are mounted. This hanger is preferably bifurcated, and the central pulley $c'$ is arranged between the parts thereof, while the outer pulleys $c$ $c^2$ are arranged on the outer side of the hanger members.

When the trolley jumps the wire and moves upwardly beyond its normal position, a depressing device is set in operation, which acts upon the multiplying-pulleys and moves the same downwardly, together with the trolley-rope, so that the trolley is drawn downward below its normal position, where the same is not liable to interfere with overhead supports. The preferred mechanism for thus depressing the trolley is constructed as follows: F represents an upright cylinder arranged within the housing and preferably secured at its upper end to the top thereof. Upon the outer side of this cylinder, at the lower end thereof, the guide-pulleys $d$ $d'$ and the support $d^2$ for the end of the trolley-rope are preferably mounted, as shown in Figs. 1, 2, and 6. G represents a piston arranged within the cylinder and provided on its under side with a hollow or tubular rod $g$, which extends through the lower head of the cylinder. This rod receives the plunger and serves as a guide therefor. Normally the piston is yieldingly held in an elevated position by means of a spring $h$, which is arranged in the space between the hollow piston-rod and cylinder and bears at opposite ends against the bottom of the cylinder and the under side of the piston. The upward movement of the piston in the cylinder may be limited in various ways—for instance, by means of a stud $i$, formed on the upper end thereof and engaging with the top of the cylinder. Whenever the trolley jumps the wire, a pressure medium is admitted into the cylinder above the piston, whereby the latter is depressed, together with the plunger and the multiplying-pulleys, which engage with the trolley-rope, thereby drawing the rope downwardly and depressing the trolley into a safe position. The plunger is compelled to thus move downwardly with the piston by coupling these parts for this purpose at this time. This coupling is preferably effected by engaging the piston with the upper end of the plunger and the lower end of the tubular rod with a shoulder $j$, formed at the junction of the lower end of the plunger and its hanger. When the piston is relieved from the pressure medium, the same is returned to its normal elevated position by the spring, and the normal operation of the take-up device is restored.

The pressure medium most suitable for depressing the piston is compressed air, which may be drawn from the same source which supplies the air-brakes of the car. The admission of the air into the cylinder is controlled by a valve, whereby the cylinder is connected either with the compressed-air supply for depressing the piston or with the atmosphere for venting the cylinder and permitting the piston to rise. This valve, which is preferably of the three-way type, as shown in Fig. 4, has its casing K provided with three ports or nipples, which are connected, respectively, by pipes $l\ l'\ l^2$ with the compressed-air supply. The upper end of the cylinder and the atmosphere, respectively, and its rotary plug $k'$ is provided with a port, whereby the cylinder-pipe may be connected either with the supply-pipe or with the vent-pipe. As shown in full lines, Fig. 4, the plug is in position for connecting the cylinder with the atmosphere and cutting the compressed air off from the same, whereby the piston is permitted to remain in its elevated position. Upon turning the plug of the valve one-quarter in the direction of the arrow, Fig. 4, until its port occupies the position shown by the dotted line the cylinder will be cut off from the atmosphere and connected with the compressed-air-supply pipe, whereby the piston therein will be depressed and pull down the trolley by means of the intermediate connecting mechanism.

The forwardly-turning movement of the valve-plug for connecting the cylinder with the pressure-supply is effected by a trip device, which couples the valve-plug with the rope when the same is moved upwardly quickly when the trolley jumps the wire and which is preferably constructed as follows: M represents a ratchet-wheel secured to the stem $k^2$ of the valve and provided with an internally-toothed ratchet-rim $m$. N represents an actuating pulley or wheel, which is arranged concentrically with reference to the ratchet-wheel and preferably mounted loosely on the valve-spindle adjacent to the outer side of the ratchet-wheel. This actuating-pulley is preferably so constructed that it telescopes over the ratchet-wheel and forms, together with the latter, a housing or inclosure for the devices, whereby the actuating-pulley and ratchet-wheel are coupled and uncoupled. The actuating-pulley is engaged with the trolley-rope, so that the movement of the latter is transmitted to the actuating-pulley, this being preferably effected by winding the trolley-rope once around the actuating-pulley, as shown in the drawings.

$n$ represents a pawl whereby the ratchet-wheel and actuating-pulley are coupled and uncoupled and which is pivotally supported between these wheels by means of a pin $o$, arranged on the actuating-pulley parallel with the axis thereof. This pawl is normally held with its nose or free end out of the path of the internal teeth on the ratchet-wheel by means of a spring $o'$, connecting the pawl with the actuating-pulley. The pawl remains in this position while the actuating-wheel is oscillated with a moderate speed by the trolley-rope as the same moves up and down in following the ordinary variations in the height of the trolley-wire, together with the trolley. If the trolley-rope is pulled upwardly with a sudden jerk, such as takes place when the trolley jumps the wire, and moves upwardly an abnormal distance, the actuating-pulley is turned forward quickly by the rope in the direction of the arrow, Fig. 4. This movement is more rapid than that which takes place during the ordinary operation of the trolley and causes the coupling-pawl to be moved outwardly by centrifugal force a sufficient distance to engage its free end or nose with the teeth of the ratchet-wheel. When this occurs, the actuating-pulley is coupled with the rotary plug of the valve and causes the latter to be turned from the venting position (shown in full lines, Fig. 4) to the pressure position, (shown by dotted lines in the same figure,) thereby admitting compressed air into the cylinder and forcing the piston downwardly for lowering the trolley. When the trolley has been depressed its full extent and the pressure of the actuating-pulley upon the pawl relaxes, the latter is automatically disengaged from the ratchet-wheel by its spring.

In order to relieve the pivot of the coupling-pawl from the strain and wear which otherwise would occur when the same engages with the ratchet-wheel, means are provided for relieving the same. The preferred means for this purpose consist of a supporting or relieving stud $p$, arranged on the actuating-pulley and engaging with a shoulder $p'$, formed on the pawl near its front end. This shoulder is constantly in engagement with the supporting-lug in all positions of the coupling-pawl, thereby resisting the shock or blow which the pawl receives upon engaging the ratchet-wheel and relieving the pivot thereof.

After the trolley has been depressed the valve is turned by the conductor or attendant in the direction for cutting off the pressure medium and connecting the cylinder with the atmosphere in order to release the trolley-rope and permit the trolley to be reengaged with the overhead conducting-wire. This restoration of the valve is preferably effected by means of a vertically-movable handle or slide Q, which moves in a guide $q$ in the top of the casing and is provided at its lower end with a horizontal slot $q'$, which receives a crank-pin $q^2$, formed on an arm projecting laterally from the ratchet-wheel. This slide is raised during the forward turning movement of the valve-plug from the position shown in full lines in Figs. 1 and 3 to the position shown in dotted lines, Fig. 1. For the purpose of restoring the valve to its normal position it is only necessary to push the sliding handle downwardly. The valve is preferably so constructed that a reversal of the same is effected by turning its plug one-quarter of a rotation, and means are provided for arresting its rotation at either end of this movement. The preferred means for this purpose consist of a stop or shoulder $r$, formed on the lower part of the sliding handle and adapted to engage with the under side of the guide $q$, and a flange $r'$, arranged at the upper end of the slide and adapted to engage with the upper end of this guide.

For the purpose of enabling the restoration of the trolley and the valve to be effected conveniently and quickly the upper part of the sliding handle is preferably made hollow or of tubular form, as shown at $q^8$, Fig. 3, and that part of the trolley-rope above the actuating-wheel passes through the hollow handle. Preparatory to restoring the trolley the conductor places his hand upon the rope immediately above the restoring-handle and pushes the latter downwardly, so as to release the rope from the depressing mechanism. When this has been done, the conductor while the rope is still in his hand restores the trolley upon the conducting-wire.

Instead of multiplying the pull upon the trolley-rope a number of times by the mechanism shown in Figs. 1, 2, and 3 the necessary extent of pull upon the rope can be produced by employing but a single multiplying wheel or pulley $s$ on the lower end of the plunger, as shown in Fig. 7. In this case the extent of movement of the plunger must be correspondingly greater in order to obtain the required depression of the trolley-pole.

In Fig. 8 is shown a construction in which the slack of the rope is wound up and unwound from a drum T, which is journaled in the lower part of the casing, instead of employing multiplying-pulleys. This drum is turned by means of a gear-rack $t$, secured to the plunger and meshing with a pinion $t'$, which is connected with the drum.

My improved trolley-catcher contains no delicate parts which are easily injured or liable to get out of order, and the construction as a whole is light and compact, permitting the same to be readily shifted from one end of the car to the other upon reversing the movement of the same.

I claim as my invention—

1. A trolley-catcher comprising a reciprocating take-up device operating upon the trolley-rope for maintaining a tension on the same during the normal operation of the trolley, a depressing device operating upon said take-up device for depressing the trolley, and a trip device engaged by the trolley-rope and controlling the depressing device, substantially as set forth.

2. A trolley-catcher comprising a vertically-movable take-up weight operating upon the trolley-rope for maintaining a tension on the same during the normal operation of the trolley, a depressing device operating upon said take-up weight for depressing the trolley, and a trip device engaged by the trolley-rope and controlling the depressing device, substantially as set forth.

3. A trolley-catcher comprising a vertically-movable take-up plunger, a pulley mounted on the plunger and engaging with the trolley-rope, a depressing device operating to depress said plunger, and a trip device engaged by the trolley-rope and controlling said depressing device, substantially as set forth.

4. A trolley-catcher comprising a vertically-movable take-up plunger, a plurality of take-up pulleys mounted on the lower end of said plunger, stationary guide-pulleys arranged above the take-up pulleys, a trolley-rope passing around the take-up and guide pulleys, a depressing device for depressing the take-up plunger, and a trip device engaged by the trolley-rope and controlling the depressing device, substantially as set forth.

5. A trolley-catcher comprising a cylinder, a take-up plunger operating upon the trolley-rope, a piston for depressing the trolley operating on said plunger and arranged in said cylinder, and means controlling a pressure medium which operates said piston, substantially as set forth.

6. A trolley-catcher comprising a cylinder, a take-up plunger operating upon the trolley-rope, a piston for depressing the trolley operating on said plunger and arranged in said cylinder, and means operated upon by the trolley-rope for controlling the admission of a pressure medium into said cylinder, substantially as set forth.

7. A trolley-catcher comprising a cylinder, a take-up plunger operating upon the trolley-rope, a piston for depressing the trolley operating on said plunger and arranged in said cylinder, means for supplying a pressure medium which operates to move the piston downwardly, and a spring for raising the piston, substantially as set forth.

8. A trolley-catcher comprising a vertically-movable take-up plunger, a pulley mounted on the lower end of the plunger and engaging with the trolley-rope, a depressing-piston provided with a tubular rod which receives the plunger, a cylinder in which said piston reciprocates, means for supplying a pressure medium into the cylinder for depressing the piston, and a spring arranged in the cylinder and operating to raise the piston, substantially as set forth.

9. A trolley-catcher comprising a cylinder, a piston operating to depress the trolley and arranged in said cylinder, means for supplying a pressure medium to the cylinder for operating said piston, and a trip device engaged by the trolley-rope and controlling said pressure-supplying means, substantially as set forth.

10. A trolley-catcher comprising a cylinder, a piston arranged in said cylinder and operating to pull down a trolley-rope, a valve operating to connect said cylinder with the atmosphere or with a pressure-supply, and a trip device operated upon by said trolley-rope and controlling said valve, substantially as set forth.

11. A trolley-catcher comprising a cylinder, a piston arranged in said cylinder and operating to pull down a trolley-rope, a valve operating to connect said cylinder with the atmosphere or with a pressure-supply, and a centrifugal trip device operated upon by the trolley-rope and adapted to transmit the movement of said rope to said valve, substantially as set forth.

12. A trolley-catcher comprising a cylinder, a piston arranged in said cylinder and operated to pull down a trolley-rope, a valve operating to connect said cylinder with the atmosphere or with a pressure-supply, a ratchet-wheel connected with said valve, an actuating-wheel engaged by the trolley-rope, and a pawl mounted on the actuating-wheel and adapted to engage with the ratchet-wheel, substantially as set forth.

13. A trolley-catcher comprising a cylinder, a piston arranged in said cylinder and operating to pull down a trolley-rope, a valve operating to connect said cylinder with the atmosphere or with a pressure-supply, a ratchet-wheel connected with said valve, an actuating-wheel engaged by the trolley-rope, a centrifugal pawl mounted on the actuating-wheel and adapted to engage with said ratchet-wheel, and a spring which normally holds said pawl out of engagement from the ratchet-wheel, substantially as set forth.

14. A trolley-catcher comprising a cylinder, a piston arranged in said cylinder and operating to pull down a trolley-rope, a valve operating to connect said cylinder with the atmosphere or with a pressure-supply, a ratchet-wheel connected with said valve and provided with internal teeth, an actuating-wheel arranged on one side of the ratchet-wheel and engaged by the trolley-rope, a centrifugal pawl pivoted on the actuating-wheel and adapted to engage with the teeth of the ratchet-wheel, and a spring operating to retract said pawl from said ratchet-wheel, substantially as set forth.

15. A trolley-catcher comprising a cylinder, a piston arranged in said cylinder and operating to pull down a trolley-rope, a valve operating to connect said cylinder with the atmosphere or with a pressure-supply, a ratchet-wheel connected with said valve, an actuating-wheel engaged by the trolley-rope, a pawl mounted on the actuating-wheel and adapted to engage with the ratchet-wheel, and a supporting lug or shoulder arranged on the actuating-wheel and engaged by a corresponding shoulder on the pawl, substantially as set forth.

16. A trolley-catcher comprising a cylinder, a piston arranged in said cylinder and operating to pull down a trolley-rope, a valve operating to connect said cylinder with the atmosphere or with a pressure-supply, a trip device operated upon by the trolley-rope and controlling said valve, and a restoring device connected with the trip device, substantially as set forth.

17. A trolley-catcher comprising a cylinder, a piston arranged in said cylinder and operating to pull down a trolley-rope, a valve operating to connect said cylinder with the atmosphere or with a pressure-supply, a trip device operated upon by the trolley-rope and controlling said valve, and a restoring-handle arranged adjacent to the trolley-rope and connected with said trip device, substantially as set forth.

18. A trolley-catcher comprising a cylinder, a piston arranged in said cylinder and operating to pull down a trolley-rope, a valve operating to connect said cylinder with the atmosphere or with a pressure-supply, a trip device operated upon by the trolley-rope and controlling said valve, and a tubular restoring-handle which receives said rope and is connected with the trip device, substantially as set forth.

19. A trolley-catcher comprising a cylinder, a piston arranged in said cylinder and operating to pull down a trolley-rope, a valve operating to connect said cylinder with the atmosphere or with a pressure-supply, a ratchet-wheel connected with said valve, an actuating-wheel engaged by the trolley-rope, a pawl mounted on the actuating-wheel and adapted to engage with the ratchet-wheel, and a tubular restoring-handle which receives the trolley-rope and is connected with said actuating-wheel, substantially as set forth.

20. A trolley-catcher comprising a cylinder, a piston arranged in said cylinder and operating to pull down a trolley-rope, a valve operating to connect said cylinder with the atmosphere or with a pressure-supply, a ratchet-wheel connected with said valve, an actuating-wheel engaged by the trolley-rope, a pawl mounted on the actuating-wheel and adapted to engage with the ratchet-wheel, a tubular restoring-handle receiving the trolley-rope and provided with a slot which receives a crank-pin on the ratchet-wheel, and a guide for said handle, substantially as set forth.

Witness my hand this 5th day of August, 1903.

HORACE R. MARTIN.

Witnesses:
THEO. L. POPP,
EMMA M. GRAHAM.